United States Patent
Lin

(10) Patent No.: US 9,500,010 B2
(45) Date of Patent: Nov. 22, 2016

(54) ANTI-THEFT DEVICE FOR ELECTRONIC DEVICES

(71) Applicant: HON HAI PRECISION INDUSTRY CO., LTD., New Taipei (TW)

(72) Inventor: Chia-Shih Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 91 days.

(21) Appl. No.: 14/251,826

(22) Filed: Apr. 14, 2014

(65) Prior Publication Data

US 2014/0318193 A1    Oct. 30, 2014

(30) Foreign Application Priority Data

Apr. 29, 2013    (TW) .............................. 102207818 U

(51) Int. Cl.
| | |
|---|---|
| *E05B 65/00* | (2006.01) |
| *E05B 73/00* | (2006.01) |
| *B60R 11/02* | (2006.01) |

(52) U.S. Cl.
CPC ........... *E05B 73/0082* (2013.01); *B60R 11/02* (2013.01); *E05B 65/00* (2013.01); *E05B 73/0017* (2013.01); *Y10T 70/5009* (2015.04)

(58) Field of Classification Search
CPC ............... E05B 65/00; E05B 73/0017; E05B 73/0082; B60R 11/02
USPC ....... 248/551, 552, 553, 225.21; 70/58, 232, 70/158, 203
See application file for complete search history.

(56) References Cited

U.S. PATENT DOCUMENTS

| | | | | |
|---|---|---|---|---|
| 3,564,879 A | * | 2/1971 | Bennett | B41J 29/04 70/232 |
| 3,672,190 A | * | 6/1972 | Palazzolo | E05B 73/0082 70/14 |
| 3,945,227 A | * | 3/1976 | Reiland | B60R 11/02 70/58 |
| 4,038,843 A | * | 8/1977 | Daley, Jr. | B60R 11/0205 248/552 |
| 4,081,979 A | * | 4/1978 | Dawson | B60R 11/02 248/551 |
| 4,117,700 A | * | 10/1978 | Saunders | B60R 11/0205 70/232 |

FOREIGN PATENT DOCUMENTS

CN    200710101611.8    10/2008

* cited by examiner

*Primary Examiner* — Tan Le
(74) *Attorney, Agent, or Firm* — Zhigang Ma

(57) ABSTRACT

Electronic device and fastening anti-theft device, for preventing theft of the electronic device and includes a lock, a screw, a bracket, and a body having a locking plate extending from a side. The locking plate includes a slot, a locking hole and a shielding piece bent and protruding from a surface of the locking plate opposite to the body of the bracket, the shielding piece crosses over the slot. The screw is fastened to the electronic device and slides along the slot, the shielding piece is used in shielding the screw, and the lock passes through the locking hole and locks the electronic device.

11 Claims, 5 Drawing Sheets

ANTI-THEFT DEVICE FOR ELECTRONIC DEVICES

FIELD

The present disclosure relates to anti-theft devices, and more particularly to an anti-theft device for electronic devices.

BACKGROUND

An anti-theft device is usually applied to protect an electronic device from theft. A traditional anti-theft device includes a lock, which is used to fasten the electronic device to a desk or some other platform. A locking piece engages with the electronic device to fasten the electronic device, and then a screw is used to lock the electronic device. The screw is easy to disassemble from the electronic device, which could lead to theft of the electronic device.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
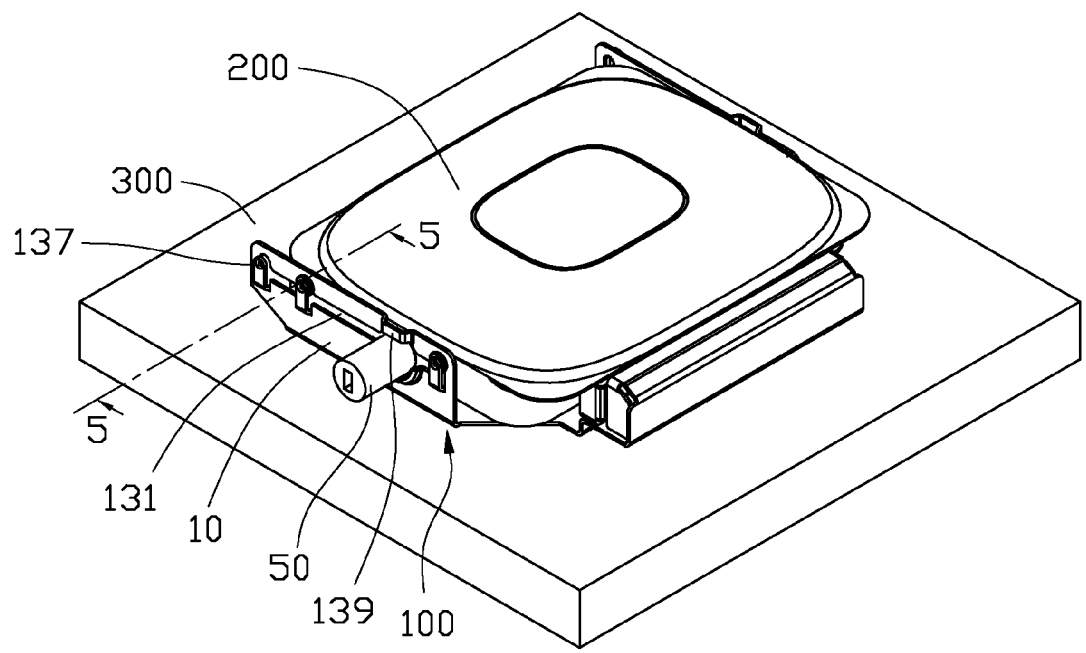
FIG. 1 is a perspective view of an anti-theft device in accordance with an exemplary embodiment of the present disclosure, when assembled ready for use.

The disclosure is illustrated by way of example and not by way of limitation in the figures of the accompanying drawings in which like reference numerals indicate the same or similar elements. It should be noted that references to "an" or "one" embodiment in this disclosure are not necessarily to the same embodiment, and such references can mean "at least one."

FIG. 1 is a perspective view of an embodiment of an anti-theft device 100. The anti-theft device is assembled and ready for use. The anti-theft device 100 is used to fasten an electronic device 200 to a plane 300 or some other platform, such as a desk for example, in order to protect the electronic device 200 from theft. In the embodiment, the anti-theft device 100 fastens the electronic device 200 to the plane 300.

Figure 2:
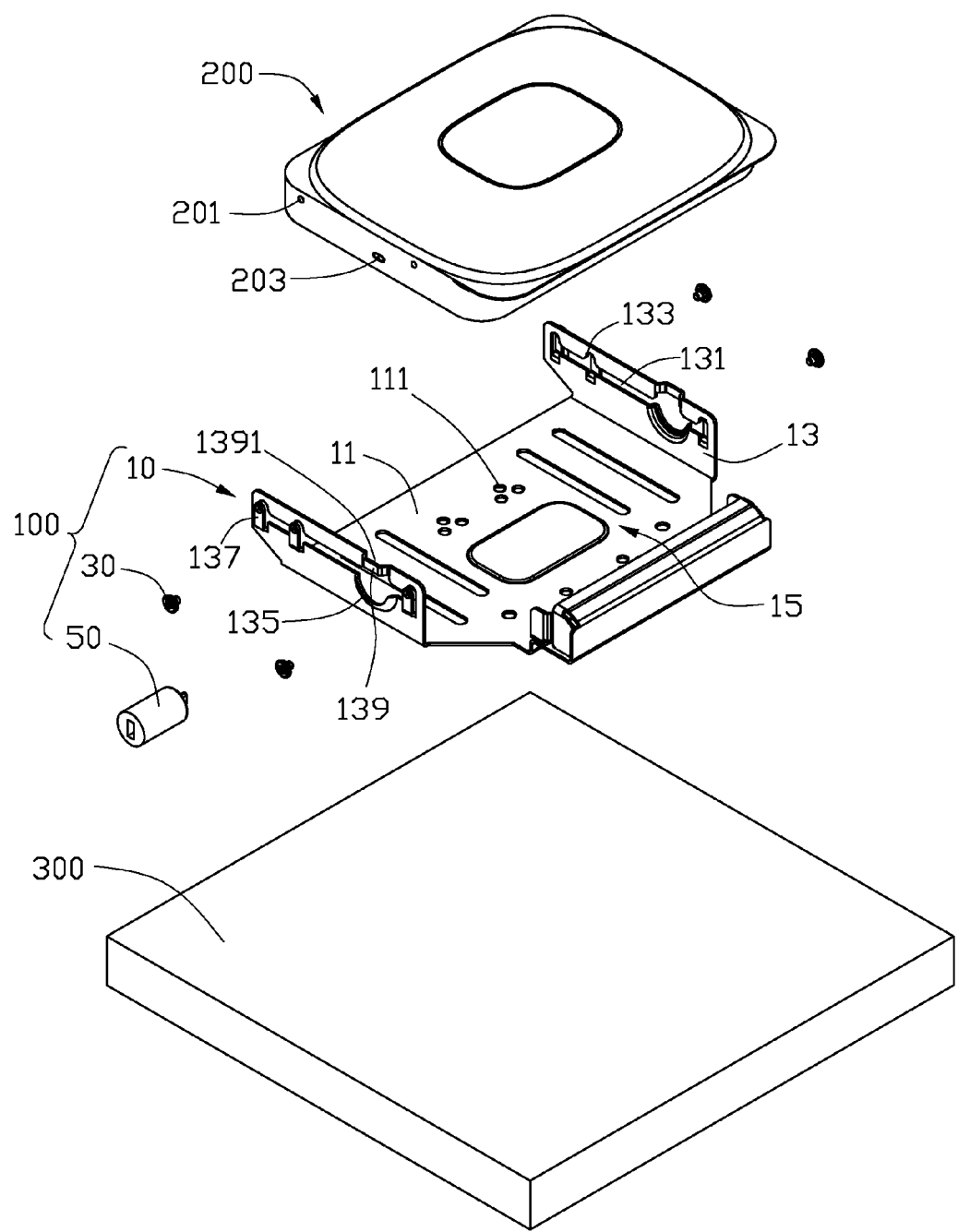
FIG. 2 is an exploded, perspective view of the anti-theft device.

FIG. 2 shows that the anti-theft device 100 includes a bracket 10, a screw 30 and a lock 50. The bracket 10 is fastened on the plane 300, and the electronic device 200 is fastened to the bracket 10 by the screw 30 and is locked to the bracket 10 by the lock 50.

The bracket 10 includes a body 11, a first locking plate 13 and a second locking plate 13. The first locking plate 13 is parallel to and corresponds with the second locking plate 13. The first locking plate 13 and the second locking plate 13 are perpendicular to the body 11. The first locking plate 13, the second locking plate 13 and the body 11 cooperatively form a receiving space 15, which is used for receiving the electronic device 200.

Figure 3:
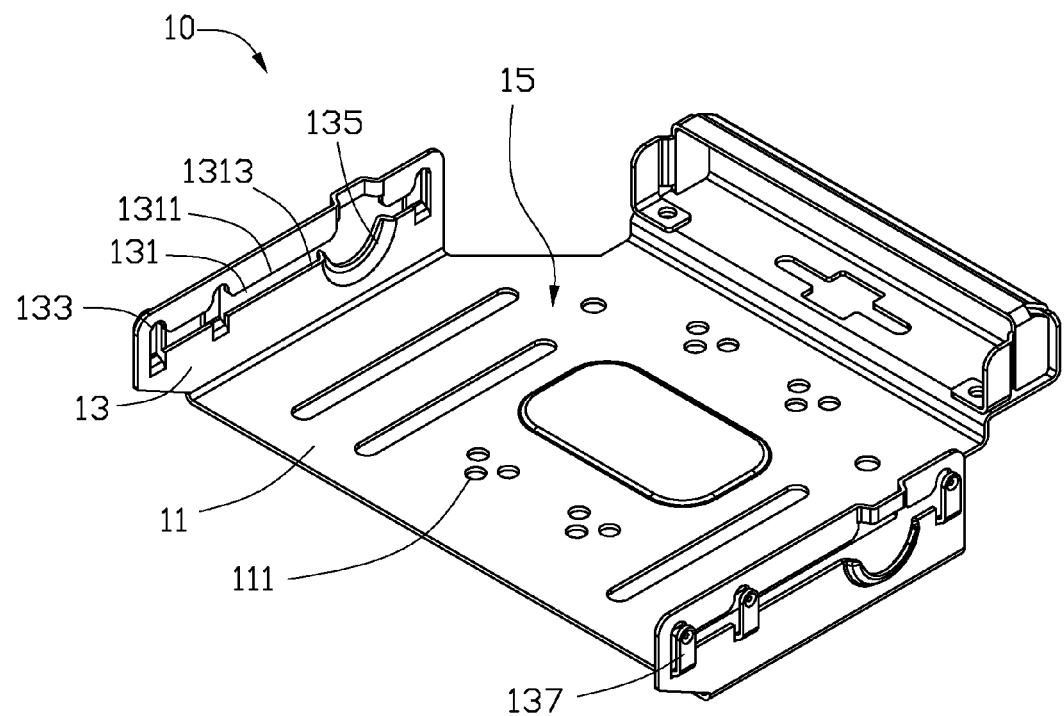
FIG. 3 is an exploded, perspective view of a bracket of the anti-theft device.
Figure 4:
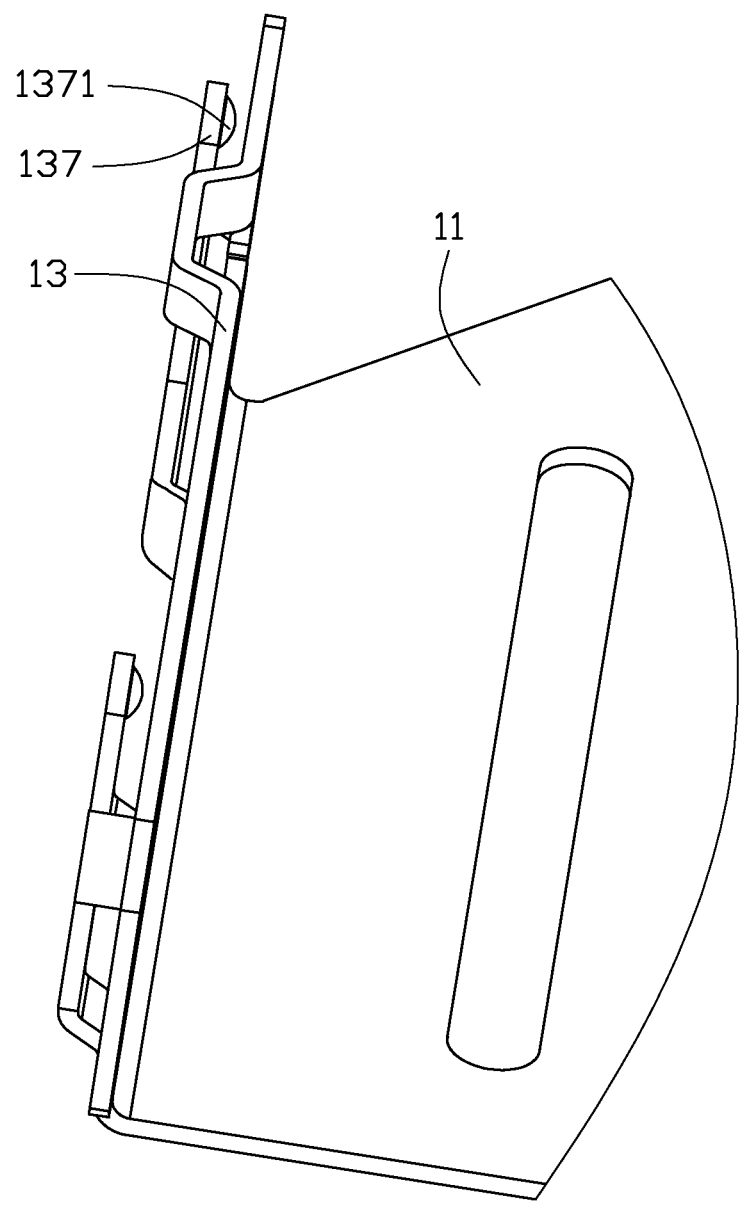
FIG. 4 is a partial, perspective view of the bracket shown in FIG. 3.

FIGS. 3 and 4 show that the body 11 is approximately plate shaped, which defines a plurality of the fixing holes 111. The fixing holes 111 engage with fasteners to fasten the bracket 10 to the plane 300.

The first locking plate 13 and the second locking plate 13 are same as each other. A slot 131 is defined on the first locking plate 13 parallel to the body 11, and the slot 131 includes a first sidewall 1311 and a second sidewall 1313, parallel to each other. The second sidewall 1313 is located between the first sidewall 1311 and the body 11, and is adjacent to the body 11.

A location hole 133 is defined on the first sidewall 1311 of the first locking plate 13 in a direction away from the body 11, in communication with the slot 131. In the embodiment, the location hole 133 is a semi-circle shaped through hole. The location hole 133 is used in receiving and stopping the screw 30. In the embodiment, the first locking plate 13 defines three location holes 133 on the first sidewall 1311 equally spaced from each other. In other embodiments, a number of location holes 133 may be one or more.

A locking hole 135 is defined on the second sidewall 1313 of the first locking plate 13 close to the body 11, in communication with slot 131 and between two location holes 133. A shape of the locking hole 135 matches an outline of the lock 50. In the embodiment, the locking hole 135 defines a semi-circle shaped through hole. In other embodiments, the locking hole 135 can be changed according to the shape and application of the lock 50, the locking hole 135 may be a rectangle-shaped or polygon-shaped.

A shielding piece 137 bends and is protruding from the second sidewall 1313 of the first locking plate 13 in a direction away from the body 11, crossing over the slot 131 shielding the location hole 133. In the embodiment, the first locking plate 13 includes three shielding pieces 137 respectively corresponding to the three location holes 133. The shielding piece 137 is used in shielding the screw 30 received in the location hole 133, which stops the screw 30 from being disassembled which may result in the theft of the electronic device 200. A projection 1371 facing the location hole 133 is located on the shielding piece 137, engaging with the electronic device 200 for support.

The first locking plate 13 includes a bent part 139 bending in the direction away from the body 11 of the bracket 10. The bent part 139 defines a channel 1391 in communication with the slot 131 and the receiving space 15, so the screw 30 can slide along the channel 1391 and into the slot 131. In the embodiment, the bent part 139 corresponds to the locking hole 135. In other embodiments, the bent part 139 does not correspond to the locking hole 135, but only keeps the channel 1391 in communication with the slot 131 and the receiving space 15.

Figure 5:
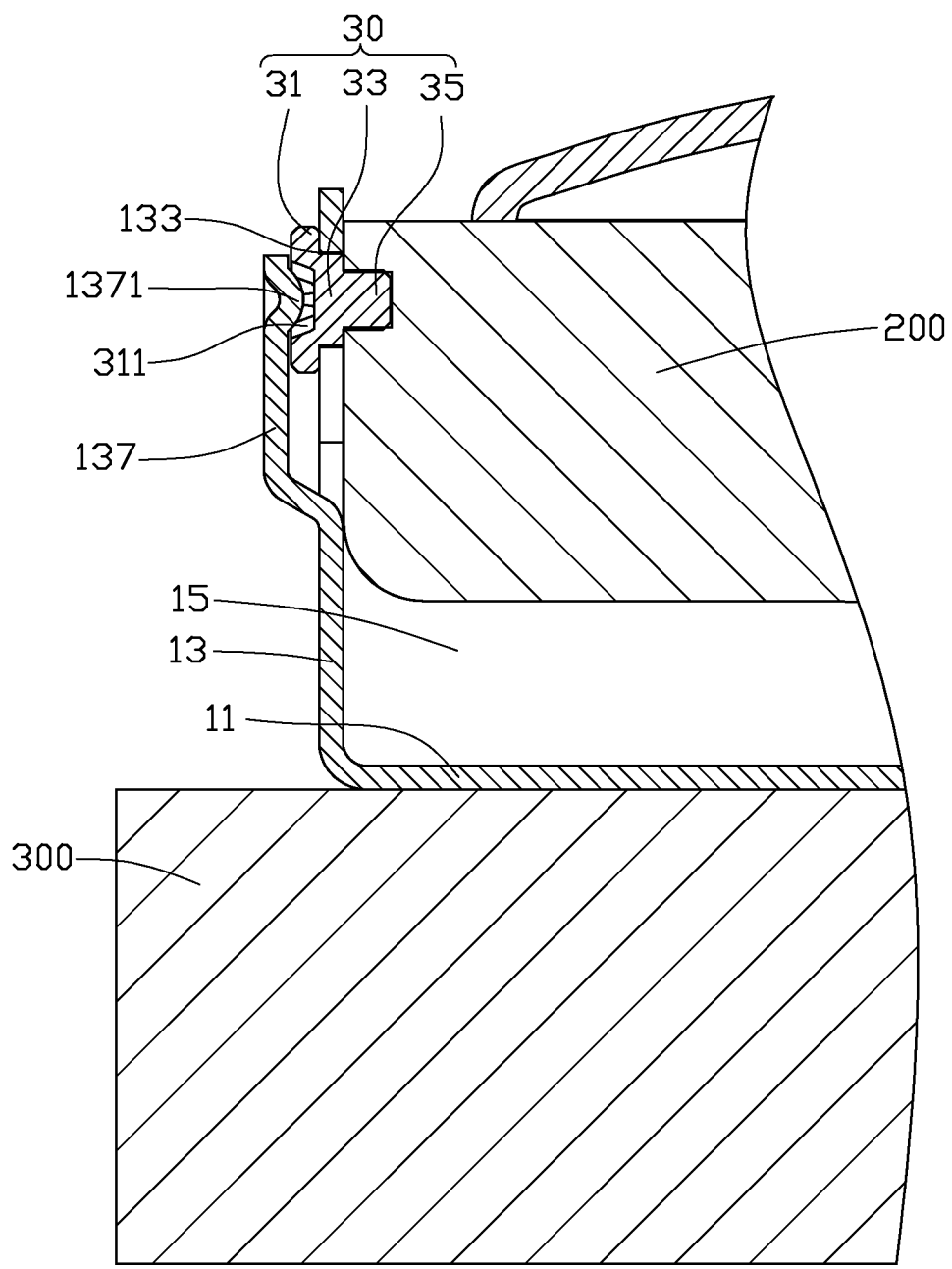
FIG. 5 is a cross-sectional view of the anti-theft device as shown in FIG. 1, corresponding to line 5-5 of FIG. 1.

FIG. 5 shows that, the screw 30 passes through the slot 131 and fastens the electronic device 200 to the bracket 10. The shielding piece 137 shields the screw 30, when the screw 30 slides along the channel 1391 (shown in FIG. 2) into the slot 131, and then slides along the slot 131 and is stopped in the location hole 133. In the embodiment, a number of the screws 30 is three, and three corresponding location holes 133 stop the three screws 30. In other embodiments, the quantity of screws 30 may be changed according to the application of the electronic device 200. The screw 30 includes a head 31, a shoulder 33 and a shaft 35. The shoulder 33 is located on a surface of the head 31, and the shaft 35 is located on the shoulder 33.

A diameter of the head 31 of the screw 30 is larger than a width of the slot 131 and is larger than a diameter of the location hole 133, so the head 31 of the screw 30 can be stopped on the first locking plate 13, when the screw 30 passes through the location hole 133. A latching hole 311 facing the projection 1371 is defined on the head 31 of the screw 30, so the projection 1371 engages with the latching hole 311 of the screw 30 fastened to the electronic device 200 to support the electronic device 200. When the screw 30 arrives at the location hole 133 and engages with the projection 1371, the screw 30 is protected from being disassembled from a side of the shielding piece 137. The screw 30 and the projection 1371 cooperatively define a rotation axis, when disassembling the electronic device 200 from the bracket 10, the electronic device 200 can rotate around the rotation axis relative to the bracket 10. The shoulder 33 faces away from the latching hole 311, a diameter of the shoulder 33 is smaller than the width of the slot 131 and the smaller than the diameter of the location hole 133, so the shoulder 33 can slide along the slot 131 and pass through the location hole 133. The shaft 35 is located on the shoulder 33 in a direction away from the head 31, and a diameter of the shaft 35 is smaller than the diameter of the shoulder 33. In the embodiment, the shaft is threaded on a periphery surface, which is used in connecting with the electronic device 200.

The lock 50 passes through the locking hole 135 and connects to the electronic device 200, and locks 50 the electronic device 200 to the bracket 10. In the embodiment, a number of locks 50 is two, so the two locks 50 respectively pass through the locking holes 135 defined in the first locking plate 13 and the second locking plate 13 and connect to the electronic device 200. In other embodiments, the quantity of the locks 50 is one, correspondingly, one of the two locking plates 13 defines one locking hole 135.

A sidewall of the electronic device 200 parallel to the locking plate 13 includes a location part 201 and a locking part 203. The location part 201 corresponds to the location hole 133, which is used to engage with the screw 30. The locking part 203 corresponds to the locking hole 135, which in used engage with the lock 50. The location part 201 with the screw 30 and the locking part 203 with the lock 50 cooperatively fasten the electronic device 200 to the bracket 10.

One way for using the anti-theft device 100 is described as follows: the fastener passes through the fixing hole 111 fastening the bracket 10 on the plane 300 or some other platform. The electronic device 200 is stacked on the body 11 and is partially received in the receiving space 15 with the location part 201 aligned to the slot 131. The screw 30 passes through the slot 131 and connects to the location part 201, with the shoulder 33 received in the slot 131 and the head 31 stopping against the locking plate 13. Moving the electronic device 200 allows the screw 30 to slide along the slot 131 until the shoulder 33 is received in the location hole 133, the head 31 is stopped between the shielding piece 137 and the location hole 133, and the projection 1371 matches with the latching hole 311. Correspondingly, the locking part 203 aligns to the locking hole 135. Finally, the lock 50 passes through the locking hole 135 and is fastened to the locking part 203.

In other embodiments, the anti-theft device 100 is described as follows: the fastener passes through the fixing hole 111 to fasten the bracket 10 on the plane 300 or other platforms, two screws 30 are respectively connected to the electronic body 11. The electronic device 200 is moved in a direction perpendicular to the body 11 with one of the two screws 30 aligned to the channel 1391, allowing the screw 30 to slide in the slot 131 along the channel 1391, aligning the electronic device 200 in a first direction away from the channel 1391 until the screw 30 is received in a location hole 133 farthest from the fixing hole 111 and the projection 1371 matches the latching hole 311. The electronic device 200 is rotated around the rotation axis defined by the projection 1371 and the latching hole 311 with the other screw 30 sliding in the slot 131 along the channel 1391. At this time, the electronic device 200 is proximately received in the receiving space 15 and is parallel with the body 11 of the bracket 10, aligning the electronic device 200 in a direction reverse to the first direction until the two screws 30 are respectively received in the location holes 133 and are shielded by the shielding piece 137 with the projection 1371 matching the latching hole 311. Finally, the lock 50 is locked to the locking part 203.

One way to disassemble the electronic device 200 from the anti-theft device 100 is described as follows: unlock the lock 50 and take the lock 50 out the locking part 203 from the locking hole 135, in order to allow the electronic device 200 to freely move in the receiving space 15. Manually align the electronic device 200 in a direction close to the body 11 of the bracket 10 to allow the shoulder 33 go into the slot 131 from the location hole 133. Move the electronic device 200 along the slot 131 to allow the screw 30 to detach from a shielding of the shielding piece 137. Manually detach the screw 30 from the electronic device 200 using a tool (not shown). Finally, remove the electronic device 200 from the receiving space 15 of the bracket 10.

In other embodiments, the electronic device 200 is disassembled from the anti-theft device 100 as follows in order for the electronic device 200 to freely move in the receiving space 15, the lock 50 is removed from the locking hole 135. The electronic device 200 is aligned in a direction close to the body 11 of the bracket 10 allowing the shoulder 33 to go into the slot 131 from the location hole 133, moving along the slot 131 allowing one screw 30 to align with the locking hole 135 and the other one screw 30 to be received in the location hole 133 with the projection 1371 matching the latching hole 311. The electronic device 200 is rotated around the rotation axis defined by the projection 1371 and the latching hole 311 with one screw 30 sliding from the first locking plate 13 along the channel 1391. Finally, the electronic device 200 moves along the slot 131 allowing the other screw 30 to slide the first locking plate 13 out from the channel 1391.

In the illustrated embodiment of the anti-theft device 100 of the present disclosure, the electronic device 200 is fastened on the bracket 10 by the screw 30 and the screw 30 is shielded by the shielding piece 137. The electronic device 200 cannot freely move relative to the bracket 10 when the electronic device 200 is locked to the bracket 10 using the lock 50. The screw 30 is shielded by the shielding piece 137, which improves the anti-theft performance of the anti-theft device 100.

In at least one embodiment, the location hole 133 may be defined on the second sidewall 1313 of the first locking plate 13 in a direction close to the body 11. Correspondingly, the shielding piece 137 bends and protrudes from the first sidewall 1311 of the first locking plate 13 in a direction close to the body 11, which covers the slot 131 and shields the location hole 133.

In at least one embodiment, the location hole 133 can be omitted, as long as the shielding piece 137 faces the location part 201, and when the screw 30 arrives at the location hole 133, the shielding piece 137 shields the head 31 of the screw 30.

In at least one embodiment, the shoulder 33 of the screw 30 can be omitted, allowing the shaft 35 to be connected to the location part 201 and the head 31 is stopped on the first locking plate 13.

In at least one embodiment, the projection 1371 can be omitted, correspondingly, the latching hole 311 is also omitted.

In at least one embodiment, the number of locking plates 13 is one, correspondingly, the number of location holes 133, shielding pieces 137, screws 30, location parts 201 and locking parts 203 is one, respectively.

In at least one embodiment, the shielding piece 137 does not bend and protrude from the first sidewall 1311 or the second sidewall 1313, the shielding piece 137 can bend and protrude from a surface of the locking plate 13 which opposite to the body 11.

In at least one embodiment, the locking hole 135 can be defined in other part of the locking plate 13 and does not communicate with the slot 131.

In at least one embodiment, the bent part 139 can be omitted, so when installing the electronic device 200 to the bracket 10, the screw 30 passes through the slot 131 and connects to the location part 201 of the electronic device 200.

Although various features and elements are described as embodiments in particular combinations, each feature or element can be used alone or in other various combinations within the principles of the present disclosure to the full extent indicated by the broad general meaning of the terms in which the appended claims are expressed.

What is claimed is:

1. An anti-theft device for fastening an electronic device to a platform and preventing the electronic device from unauthorized removal, the anti-theft device comprising:
   a lock;
   a screw; and
   a bracket comprising a body and at least one locking plate extending from a side of the body;
   wherein the at least one locking plate defines a slot and a locking hole, wherein the slot and the locking hole are in the same plane, and comprises a bent shielding piece protruding from a side of the at least one locking plate opposite to the body of the bracket, and the shielding piece extends across the slot;
   wherein the screw is fastened to the electronic device and slides along the slot, until the screw is shielded by the shielding piece, and the lock passes through the locking hole and locks up the electronic device; wherein the slot comprises a first sidewall and a second sidewall opposite the first sidewall, the first sidewall and the second sidewall are parallel with the body, and the second sidewall is located between the first sidewall and the body; wherein the bent shielding piece is protruding from the second sidewall in a direction away from the body.

2. The anti-theft device of claim 1, wherein a plurality of fixing holes are defined in the body of the bracket, the fixing holes engage with fasteners to fasten the bracket on a desk.

3. The anti-theft device of claim 1, wherein a location hole communicating with the slot is defined in the first sidewall of the at least one locking plate and extends in a direction away from the body, which is shielded by the shielding piece.

4. The anti-theft device of claim 3, wherein the shielding piece shields the screw, when the screw slides along the slot and is received in the location hole.

5. The anti-theft device of claim 3, wherein the screw comprises a head and a shoulder located on the head, a diameter of the head is larger than a width of the slot, a diameter of the shoulder is larger than the width of the slot, the head is stopped on the at least one locking plate, and the shoulder passes through the slot of the at least one locking plate.

6. The anti-theft device of claim 5, wherein a latching hole is defined in the second surface of the head of the screw, a projection protruding from a surface of the shielding piece faces to the latching hole, and the projection engages with the latching hole.

7. The anti-theft device of claim 5, wherein the screw further comprises a shaft part, which is located on the shoulder and extends in a direction away from the head, a diameter of the shaft is smaller than the diameter of the shoulder, and the shaft passes through the slot and connects to the electronic device.

8. The anti-theft device of claim 1, wherein at least one locking plate comprises a first locking plate and a second locking plate, the first locking plate has a same structure with the second locking plate, the first locking plate and the second locking plate are respectively perpendicularly located on two opposite sides of the body.

9. The anti-theft device of claim 1, wherein the at least one locking plate comprises a bent part which bends in the direction away from the body of the bracket, the bent part defines a channel in communication with the slot.

10. The anti-theft device of claim 6, wherein the screw and the projection cooperatively define a rotation axis, and the electronic device rotates around the rotation axis relative to the bracket.

11. The anti-theft device of claim 8, wherein the first locking plate, the second locking plate and the body cooperatively form a receiving space to receive the electronic device.

* * * * *